US010514150B2

(12) United States Patent
Huang et al.

(10) Patent No.: US 10,514,150 B2
(45) Date of Patent: Dec. 24, 2019

(54) SOLID-STATE LUMINAIRE REFLECTOR ASSEMBLY

(71) Applicants: Qiong Huang, San Jose, CA (US); Michael Quilici, Essex, MA (US); Seung Cheo Ryu, Marblehead, MA (US)

(72) Inventors: Qiong Huang, San Jose, CA (US); Michael Quilici, Essex, MA (US); Seung Cheo Ryu, Marblehead, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 39 days.

(21) Appl. No.: 15/438,969

(22) Filed: Feb. 22, 2017

(65) Prior Publication Data

US 2018/0238518 A1 Aug. 23, 2018

(51) Int. Cl.

| | |
|---|---|
| ***F21V 7/00*** | (2006.01) |
| ***F21V 7/06*** | (2006.01) |
| ***F21V 7/04*** | (2006.01) |
| ***F21K 9/68*** | (2016.01) |
| ***F21V 7/08*** | (2006.01) |

(Continued)

(52) U.S. Cl.

CPC .............. *F21V 7/0083* (2013.01); *F21K 9/68* (2016.08); *F21S 8/00* (2013.01); *F21V 7/04* (2013.01); *F21V 7/041* (2013.01); *F21V 7/06* (2013.01); *F21V 7/08* (2013.01); *F21Y 2105/10* (2016.08);

(Continued)

(58) Field of Classification Search

CPC .......... F21V 7/0083; F21V 7/041; F21V 7/06; F21V 7/08; F21K 9/68; F21Y 2115/10; F21Y 2115/15

See application file for complete search history.

(56) References Cited

U.S. PATENT DOCUMENTS

| | | | | |
|---|---|---|---|---|
| 9,400,087 | B2 * | 7/2016 | Marquardt | F21V 7/0066 |
| 2005/0265024 | A1 * | 12/2005 | Luk | F21S 10/02 362/231 |

(Continued)

OTHER PUBLICATIONS

Demirel, Mehmet, International Search Report and Written Opinion of the International Searching Authority, for counterpart application PCT/US2018/015457, dated Nov. 6, 2018, European Patent Office, Rijswijk, The Netherlands, 10 pages.

*Primary Examiner* — Tsion Tumebo

(74) *Attorney, Agent, or Firm* — Yutian Ling

(57) ABSTRACT

A reflector assembly for a solid-state luminaire is disclosed. The disclosed reflector assembly may be configured, in accordance with some embodiments, to be disposed over a given printed circuit board (PCB) of a host luminaire such that emissions of emitters populated over that PCB are reflected out of the luminaire via the reflector assembly. In some embodiments, the reflector assembly may be formed from one or more reflective members, which may be generally bar-shaped or cup-shaped, or other example configurations. In some other embodiments, the reflector assembly may be formed from a bulk body having one or more reflective cavities formed therein. The particular configuration of a given reflective member or reflective cavity, as the case may be, of the reflector assembly, as well as the particular arrangement thereof for a host luminaire, may be customized as desired for a given target application or end-use.

10 Claims, 4 Drawing Sheets

(51) Int. Cl.
*F21S 8/00* (2006.01)
*F21Y 115/10* (2016.01)
*F21Y 115/15* (2016.01)
*F21Y 105/10* (2016.01)

(52) U.S. Cl.
CPC ........ *F21Y 2115/10* (2016.08); *F21Y 2115/15* (2016.08)

(56) References Cited

U.S. PATENT DOCUMENTS

2009/0323330 A1 12/2009 Gordin et al.
2010/0110671 A1* 5/2010 Gordin .................... F21V 5/007 362/228
2010/0128475 A1 5/2010 Kovalchick et al.
2010/0195326 A1* 8/2010 Boxler ...................... F21K 9/00 362/235
2010/0195330 A1 8/2010 Schaefer et al.
2011/0051420 A1* 3/2011 Gill ......................... F21S 8/086 362/249.03
2012/0147333 A1* 6/2012 Jorgensen .............. G03B 33/06 353/31
2012/0147589 A1 6/2012 Farmer
2012/0206918 A1* 8/2012 Lee ......................... F21S 2/005 362/249.02
2012/0218751 A1* 8/2012 Bacon ..................... F21S 8/086 362/235
2014/0268733 A1* 9/2014 Holland ................ F21V 21/096 362/231
2015/0085481 A1* 3/2015 Ryu ........................ F21S 8/046 362/233
2015/0264779 A1* 9/2015 Olsen ...................... F21S 8/026 315/294
2016/0123564 A1* 5/2016 Quilici .................. F21V 23/003 362/233

* cited by examiner

SOLID-STATE LUMINAIRE REFLECTOR ASSEMBLY

FIELD OF THE DISCLOSURE

The present disclosure relates to solid-state lighting (SSL) and more particularly to light-emitting diode (LED)-based luminaires.

BACKGROUND

Traditional adjustable lighting fixtures, such as those utilized in theatrical lighting, employ mechanically adjustable lenses, track heads, gimbal mounts, and other mechanical parts to adjust the angle and direction of the light output thereof. Mechanical adjustment of these components is normally provided by actuators, motors, or manual adjustment by a lighting technician. However, the cost of such designs is normally high given the complexity of the mechanical equipment required to provide the desired degree of adjustability. In addition, existing designs generally include relatively large components.

Figure 1:
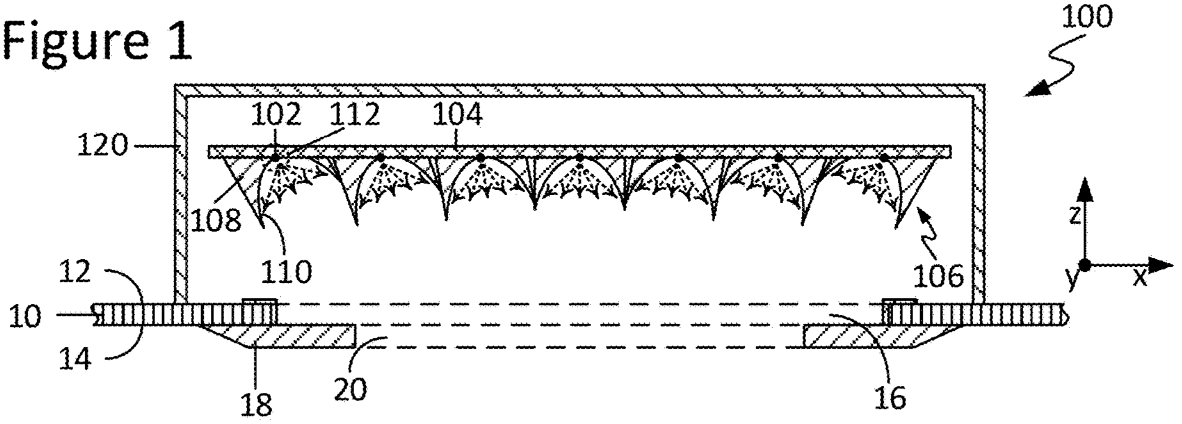
FIG. 1 is a cross-sectional view of a luminaire configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A reflector assembly for a solid-state luminaire is disclosed. The disclosed reflector assembly may be configured, in accordance with some embodiments, to be disposed over a given printed circuit board (PCB) of a host luminaire such that emissions of emitters populated over that PCB are reflected out of the luminaire via the reflector assembly. In some embodiments, the reflector assembly may be formed from one or more reflective members, which may be generally bar-shaped or cup-shaped, or other example configurations. In some other embodiments, the reflector assembly may be formed from a bulk body having one or more reflective cavities formed therein. The particular configuration of a given reflective member or reflective cavity, as the case may be, of the reflector assembly, as well as the particular arrangement thereof for a host luminaire, may be customized as desired for a given target application or end-use. Numerous configurations and variations will be apparent in light of this disclosure.

General Overview

Some existing solid-state luminaire designs employ lenses to focus solid-state emitter output. However, with the use of lenses, these luminaires generally suffer from chromatic aberration, especially at high angles. Moreover, such lenses are typically provided in great quantity, complicating the optical design of the host luminaire, as well as increasing overall luminaire size and complexity of assembly. In occupying a greater amount of space within the luminaire, these lenses also leave less room for other solid-state lighting components, such as heatsinks and controllers for emitters.

Thus, and in accordance with some embodiments of the present disclosure, a reflector assembly for a solid-state luminaire is disclosed. The disclosed reflector assembly may be configured, in accordance with some embodiments, to be disposed over a given printed circuit board (PCB) of a host luminaire such that emissions of emitters populated over that PCB are reflected out of the luminaire via the reflector assembly. In some embodiments, the reflector assembly may be formed from one or more reflective members, which may be generally bar-shaped or cup-shaped, or other example configurations. In some other embodiments, the reflector assembly may be formed from a bulk body having one or more reflective cavities formed therein. The particular configuration of a given reflective member or reflective cavity, as the case may be, of the reflector assembly, as well as the particular arrangement thereof for a host luminaire, may be customized as desired for a given target application or end-use.

A given constituent reflective member or reflective cavity of a reflector assembly provided as described herein may be of any desired geometry and dimensions, and in some cases may be configured, for example, as a parabolic reflector, a spun reflector, an elliptical reflector, a cone reflector, or a freeform (e.g., free-surface) reflector. In some cases, a given reflective member or reflective cavity may be rotationally symmetrical, though such symmetry is not required. In some embodiments, the disclosed reflector assembly may be formed as a monolithic component, whereas in other embodiments it may be formed as a plurality of components that are affixed, adjoined, or otherwise disposed proximate one another. In some cases, the disclosed reflector assembly may be generally planar in form and configured to be associated with one or more generally planar PCBs, though it should be noted that planarity is not required.

In some instances, a reflector assembly provided as described herein may be configured such that at least one of its constituent reflective members or reflective cavities differs in orientation from at least one other of the constituent reflective members or reflective cavities in a single direction or in multiple directions. In some cases, all (or some sub-set)

of the constituent reflective members or reflective cavities may be configured with converging optical axes. In some cases, all (or some sub-set) of the constituent reflective members or reflective cavities may be configured with diverging optical axes. In some cases, one or more reflectors in the reflector array may direct emissions from one or more solid-state emitters to emit beams with different beam properties. Beam properties may include, but are not limited to, a beam location, a beam orientation, a beam angle, an intensity distribution, and a color.

In accordance with some embodiments, a reflector assembly provided as described herein may be configured to provide a host luminaire with the ability to produce multiple spot lights with narrow beam angles, allowing for a good degree of control over the direction of light output and illumination area. In some instances, a reflector assembly provided as described herein may be configured to provide for illumination from different directions to achieve a given target beam size or beam pattern, among other beam attributes. In some instances, a reflector assembly configured as described herein may provide for multiple different narrow beam illumination from a single illumination aperture (e.g., for cases in which a host luminaire is mounted or otherwise configured in a manner providing such an aperture).

For a given host luminaire, the particular configuration of emitter(s) and reflector assembly may be customized based on any of a wide range of factors. For instance, the particular configuration may be based on one or more factors, such as but not limited to, a desired illumination angle, a desired illumination area, a target mounting height (or other distance), a desired amount of surface illuminance, or a desired degree of lighting uniformity. If a given luminaire design employs a particular aperture shape or size, the emitters and reflector assembly may be positioned and oriented to accommodate the particular aperture characteristics, in accordance with some embodiments. For instance, if a luminaire employs a linear slot aperture, then an elongate PCB with a few rows and greater number of columns (or vice versa) of emitters and a correspondingly configured reflector assembly may be utilized, in accordance with an embodiment. In some instances, a reflector assembly provided as described herein may be configured to permit emissions of associated emitters to pass through the same aperture (e.g., of a host luminaire, a mounting surface, or both), thereby eliminating or otherwise reducing multiple shadow effects which otherwise might manifest. Because the disclosed reflector assembly includes reflective surface(s) that serve to reflect emissions out of a host luminaire, chromatic aberration may be prevented (or otherwise reduced), contrary to existing strictly lens-based luminaire designs, in accordance with some embodiments.

In some embodiments, a reflector assembly provided as described herein may have a cross-sectional profile that is reduced in size as compared to traditional non-planar optics assemblies typically employed in effort to provide light distribution adjustment in solid-state luminaires. In some cases, this may leave more space within a host luminaire for heatsinks and other thermal management components, leading to improvements in heat dissipation, which in turn may improve emitter lifespan and allow for high-lumen lighting devices. In some instances, the additional space may allow for emitter controller componentry to be disposed within the host luminaire.

As will be appreciated in light of this disclosure, the integration of multiple reflector components into a single reflector assembly element (e.g., monolithic or otherwise) may reduce the total cost for luminaire components and improve overall system reliability, at least in some cases. Moreover, in some instances, processes used in producing a reflector assembly configured as variously described herein may be simplified, realizing reductions in manufacturing cost and time. In some instances, a reflector assembly provided as described herein may be configured, for example, as a partially or completely assembled unit, whereas in some other instances, it may be provided as a kit or other collection of discrete components, which may be operatively coupled and installed in a host luminaire, as desired.

Structure and Operation

FIG. 1 is a cross-sectional view of a luminaire 100 configured in accordance with an embodiment of the present disclosure. As can be seen, luminaire 100 may include one or more solid-state emitters 102 populated over one or more printed circuit boards (PCBs) 104. A reflector assembly 106 may be disposed over PCB(s) 104 such that emissions of emitter(s) 102 reflect from a given interior reflective surface 110 of a given constituent reflector 108 of reflector assembly 106, in accordance with some embodiments. In disposing reflector assembly 106 over PCB(s) 104, a given emitter 102 may come to reside, at least partially, within (e.g., internal to or otherwise on) a given reflector 108, for example, at a region 112 of that reflector 108. In some cases, region 112 may lie near or on a given vertex, apex, or other desired locus of a reflector 108. These (and optionally other) elements may be disposed, in part or in whole, within a housing 120, in accordance with some embodiments.

A given emitter 102 may have any of a wide range of configurations. For instance, in accordance with some embodiments, a given emitter 102 may be a light-emitting diode (LED), an organic light-emitting diode (OLED), a polymer light-emitting diode (PLED), or other semiconductor light source. A given emitter 102 may be configured to emit electromagnetic radiation (e.g., light) from any one, or combination, of spectral bands, such as, for example, the visible spectral band, the infrared (IR) spectral band, and the ultraviolet (UV) spectral band, among others. In some cases, a given emitter 102 may be configured for emissions of a single correlated color temperature (CCT). For instance, a given emitter 102 may be a white light-emitting semiconductor light source device. In some cases, a given emitter 102 may be configured for color-tunable emissions. For instance, a given emitter 102 may be configured for a bi-color, tri-color, or other multi-color combination of emissions, such as red-green-blue (RGB), red-green-blue-yellow (RGBY), red-green-blue-white (RGBW), or dual-white (warm white and cool white). In some cases, a given emitter 102 may be configured as a high-brightness semiconductor light source. In an example case, a given emitter 102 may be a high-power semiconductor light source (e.g., about 350 mA or greater, about 1 W or greater). A given emitter 102 may be configured for a Lambertian, batwing, or other given distribution of angular light intensity, as desired for a given target application or end-use.

Furthermore, the dimensions and geometry of a given emitter 102 may be customized, as desired for a given target application or end-use. For instance, in some cases, a given emitter 102 may be of generally triangular, quadrilateral, pentagonal, hexagonal, or other polygonal footprint (e.g., as viewed from a top-down vantage). In some other cases, a given emitter 102 may be of generally circular, elliptical, oval, or other curved footprint (e.g., as viewed from a top-down vantage). Other suitable configurations for emitter(s) 102 will depend on a given application and will be apparent in light of this disclosure.

Emitter(s) 102 may be packaged or non-packaged, as desired, and may be populated over one or more PCBs 104 (or other suitable intermediate or substrate), in accordance with some embodiments. A given emitter 102 may be electrically coupled with a given PCB 104 via any suitable standard, custom, or proprietary electrical coupling means, such as, for example, a wire bond, which may be formed as typically done via any suitable electrically conductive material(s) and any suitable technique(s), as will be apparent in light of this disclosure. In some cases, a given PCB 104 further may include other componentry populated there over, such as, for example, resistors, transistors, capacitors, integrated circuits, and power and control connections for a given emitter 102.

A given PCB 104 may be generally planar or non-planar, in part or in whole, as desired for a given target application or end-use. In some cases, a given PCB 104 may be bendable or otherwise flexible, in part or in whole. In some embodiments, a given PCB 104 may be foldable (e.g., may include one or more joints or other points of defined articulation). In some cases, luminaire 100 may include a single PCB 104, whereas in some other cases, luminaire 100 may include a plurality of PCBs 104, which optionally may be affixed, adjoined, or otherwise disposed proximate one another. In some instances, a multiple-section circuit may be provided by PCB(s) 104. Other suitable configurations for PCB(s) 104 will depend on a given application and will be apparent in light of this disclosure.

The particular configuration of reflector assembly 106 may be customized, as desired for a given target application or end-use. In accordance with some embodiments, reflector assembly 106 may include one or more reflectors, such as, for example, a reflective member **108*a* or a reflective cavity 108*b*, discussed below with respect to FIGS. 2-5B. For consistency and ease of understanding of the present disclosure, reflective members 108*a* and reflective cavities 108*b* hereinafter may be collectively referred to generally as reflectors 108**, except where separately referenced.

Figure 2:
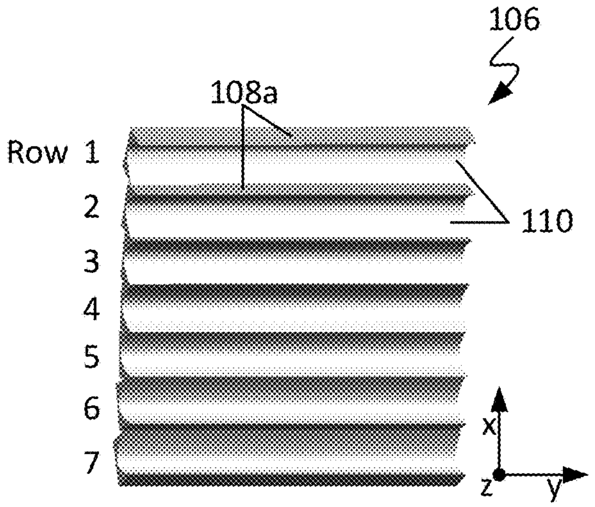
FIG. 2 is a plan view of a reflector assembly configured in accordance with an embodiment of the present disclosure.
Figure 3:
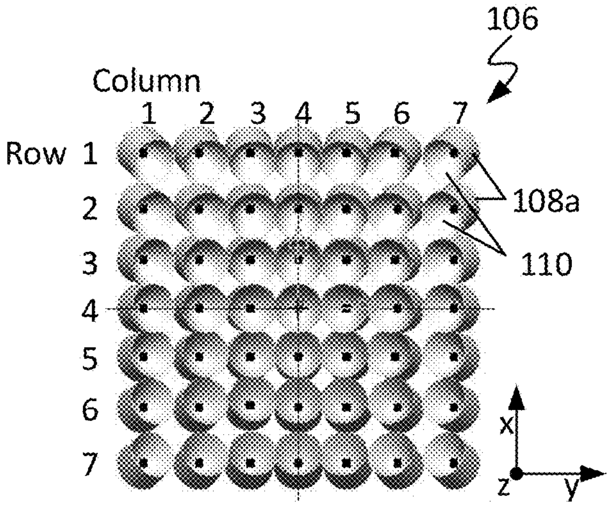
FIG. 3 is a plan view of a reflector assembly configured in accordance with another embodiment of the present disclosure.

FIG. 2 is a plan view of a reflector assembly 106 configured in accordance with an embodiment of the present disclosure. FIG. 3 is a plan view of a reflector assembly 106 configured in accordance with another embodiment of the present disclosure. As can be seen, in some embodiments, reflector assembly 106 may include an array of reflective members **108*a*. In some cases, a given reflective member 108*a* may be generally bar-shaped (e.g., such as is generally shown in FIG. 2). In some cases, a given reflective member 108*a* may be generally cup-shaped (e.g., such as is generally shown in FIG. 3). It should be noted, however, that the present disclosure is not intended to be limited only to reflective members 108*a* of the example shapes of FIGS. 2 and 3**, as numerous other suitable configurations will be apparent in light of this disclosure.

In some cases, all (or some sub-set) of reflective members **108*a* of reflector assembly 106 may be formed as a monolithic element (e.g., a singular, continuous, unitary element). In some other cases, all (or some sub-set) of reflective members 108*a* of reflector assembly 106** may be formed as separate, individual elements, which may be affixed, adjoined, or otherwise disposed adjacent one another. Numerous configurations and variations will be apparent in light of this disclosure.

Figure 4A:
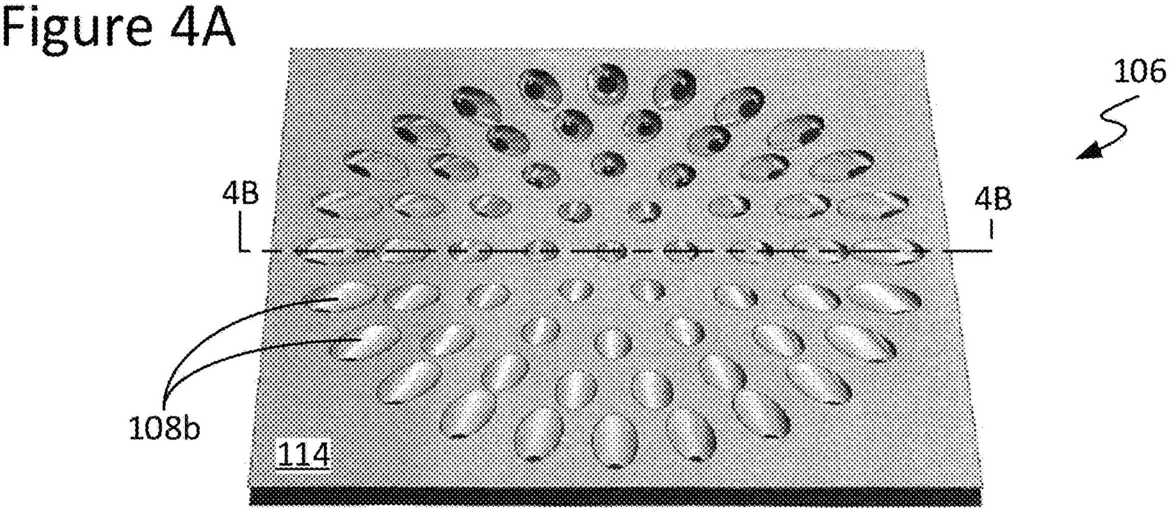
FIG. 4A is a perspective view of a reflector assembly configured in accordance with another embodiment of the present disclosure.
Figure 4B:
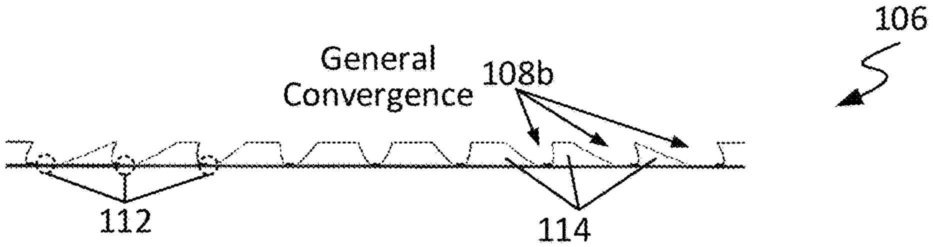
FIG. 4B is a cross-sectional view of the reflector assembly of FIG. 4A.
Figure 5A:
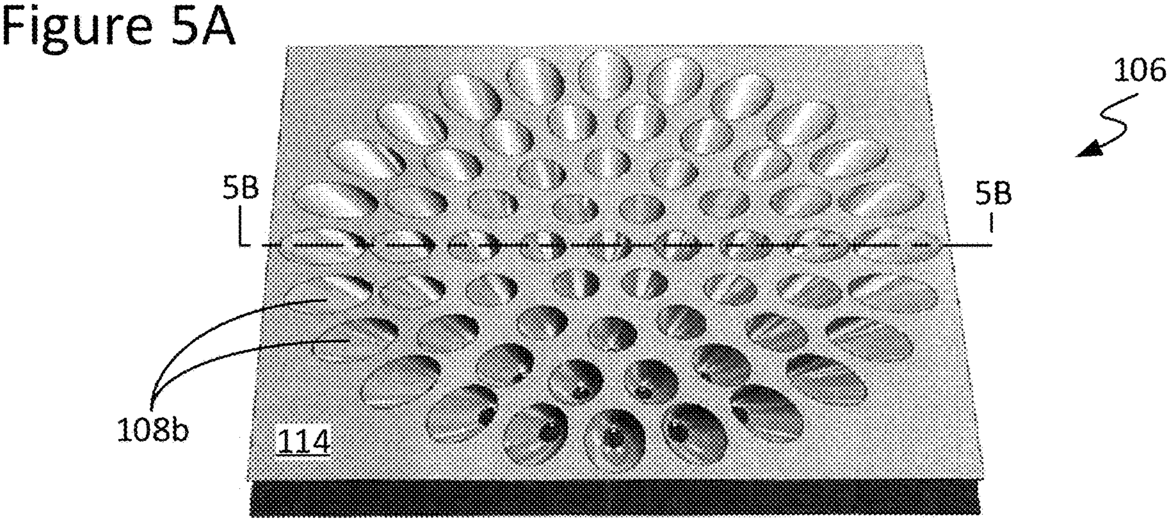
FIG. 5A is a perspective view of a reflector assembly configured in accordance with another embodiment of the present disclosure.
Figure 5B:
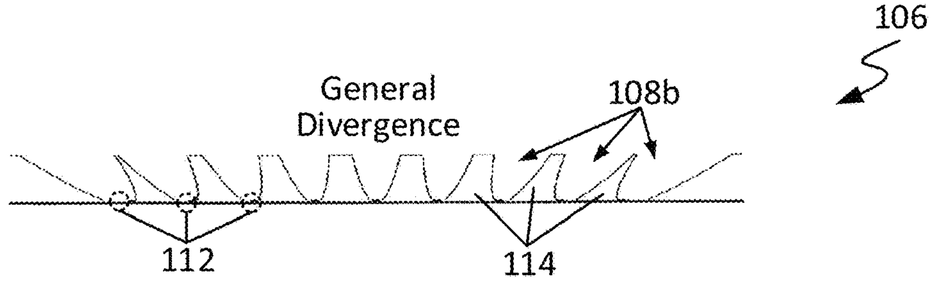
FIG. 5B is a cross-sectional view of the reflector assembly of FIG. 5A.
Figure 6A:
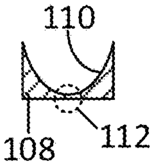
FIGS. 6A-6D illustrate cross-sectional views of several example reflectors configured in accordance with some embodiments of the present disclosure.
Figure 6B:
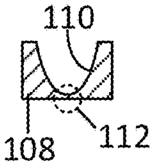
Figure 6C:
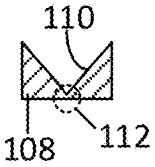
Figure 6D:
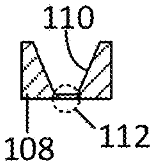

FIG. 4A is a perspective view of a reflector assembly 106 configured in accordance with another embodiment of the present disclosure. FIG. 4B is a cross-sectional view of the reflector assembly 106 of FIG. 4A. FIG. 5A is a perspective view of a reflector assembly 106 configured in accordance with another embodiment of the present disclosure. FIG. 5B is a cross-sectional view of the reflector assembly 106 of FIG. 5A. As can be seen, in some embodiments, reflector assembly 106 may include an array of reflective cavities **108*b* formed in a body 114, such as a substrate or other bulk medium. In accordance with some embodiments, a given reflective cavity 108*b* may be formed so as to traverse the full local thickness of body 114, extending from one surface thereof to a second, opposing surface thereof. In FIGS. 4B and 5B, portions 112 denoted by dotted circles may correspond generally with regions in which emitter(s) 102 may be made to reside, for instance, upon disposing reflector assembly 106 over PCB(s) 104**, in accordance with some embodiments.

A given reflector 108 (e.g., reflective member **108*a* or reflective cavity 108*b*, as the case may be) of reflector assembly 106 may be configured to achieve a given desired beam property or properties from associated emitter(s) 102, as desired for a given target application or end-use. In some cases, the reflector assembly 106 may be configured so that beams emitted from different emitters 102 exhibit different beam properties. For example, a first reflector in the reflector assembly 108 may direct emissions from an associated first emitter to emit a first beam, and a second reflector in the reflector assembly 108 may direct emissions from an associated second emitter to emit a second beam. The beam properties of the first and second beam may be different. Beam properties may include, but are not limited to, a beam location, a beam orientation, a beam angle, an intensity distribution, and a color. To this end, a given reflector 108 may be configured, for example, as an axial reflector, a side reflector, or other reflector configured as typically utilized in lighting applications. In some cases, a given reflector 108 may be configured as any one, or combination, of a parabolic reflector, a spun reflector, an elliptical reflector, a cone reflector, or a freeform (e.g., free-surface) reflector. In some cases, a given reflector 108 may be configured to convert the distribution of angular intensity of emitter(s) 102 associated therewith from a first distribution to a second distribution. For instance, consider the case where an emitter 102 is configured for a Lambertian distribution of angular light intensity. In accordance with some embodiments, an associated reflector 108 may be configured to convert the distribution of that emitter 102 to a narrow beam distribution with any one, or combination, of a specific target beam angle, beam orientation, and emitting point, among other properties, to achieve a given illumination distribution desired for a given target application or end-use. In a more general sense, a given reflector 108 may be configured, as desired, to help steer the emissions of associated emitter(s) 102, and thus help to steer the overall light distribution of luminaire 100**.

The cross-sectional geometry of a given reflector 108 may be customized, as desired for a given target application or end-use. FIGS. 6A-6D illustrate cross-sectional views of several example reflectors 108 configured in accordance with some embodiments of the present disclosure. As can be seen, some example cross-sectional geometries include parabolic, semi-elliptical, triangular, and trapezoidal. It should be noted, however, that the present disclosure is not intended to be limited only to the example cross-sectional geometries illustrated here, as numerous other configurations will be apparent in light of this disclosure. For instance, some other cross-sectional geometries for a given reflector 108 may be include semi-circular, semi-oval, rectangular, square, and freeform, among others. Portions 112 denoted by dotted circles in FIGS. 6A-6D may correspond generally with regions at which emitter(s) 102 may be made to reside, for instance, upon disposing reflector assembly 106 over PCB(s) 104, in accordance with some embodiments. Other suitable reflector 108 cross-sectional geometries will depend on a given application and will be apparent in light of this disclosure.

In accordance with some embodiments, a given reflective surface 110 of a given reflector 108 may be provided with a texture, which may be customized, as desired for a given target application or end-use. For instance, a given reflective surface 110 may have a texture that is, in part or in whole, smooth, roughened, or faceted, among others. In some instances, a given reflective surface 110 may be provided, in part or in whole, directly by the bare surface topography of reflector assembly 106 (e.g., the exposed surface contours of a reflective member 108*a* or a reflective cavity 108*b*, as the case may be), whereas in some other instances, a given reflective surface 110 may be provided, in part or in whole, by a layer (e.g., a reflective film or coating) disposed over any such surface. Some examples may include metalized films and coatings, anti-reflective films and coatings, and dichroic films and coatings, among others. In some instances, a given reflective surface 110 may be configured to provide for color mixing of the emissions of associated emitter(s) 102. Other configurations for a given surface 110 of reflector assembly 106 will depend on a given application and will be apparent in light of this disclosure.

In some embodiments, reflector assembly 106 may be configured such that all (or some sub-set) of its reflectors 108 are generally arranged in a matrix (e.g., a grid of one or more rows and one or more columns). In some cases, designation of a given reflector 108 as being a constituent of a given row or column may be arbitrary (e.g., in some instances, row and column designations may be interchangeable). In some embodiments, reflector assembly 106 may be configured such that all (or some sub-set) of its reflectors 108 are generally arranged in a cellular array, with neighboring cells directly abutting one another (e.g., in contact with one another at one or mode sides or edges) or having one or more intervening elements. In some embodiments, reflector assembly 106 may be configured such that all (or some sub-set) of its reflectors 108 are generally arranged in a nested array (e.g., concentric, eccentric, coaxial, and so forth). Numerous arrangements for a given reflector assembly 106 will be apparent in light of this disclosure.

For a given reflector assembly 106, the particular arrangement of reflectors 108 may be customized, as desired for a given target application or end-use. For instance, in some embodiments, reflector(s) 108 may be distributed, in part or in whole, as a regular array in which all (or some sub-set) of reflector(s) 108 are arranged in a systematic manner in relation to one another. In some embodiments, reflector(s) 108 may be distributed, in part or in whole, as a semi-regular array in which a sub-set of reflector(s) 108 are arranged in a systematic manner in relation to one another, but at least one other reflector 108 is not so arranged. In some embodiments, reflector(s) 108 may be distributed, in part or in whole, as an irregular array in which all (or some sub-set) of reflector(s) 108 are not arranged in a systematic manner in relation to one another. The quantity, density, and spacing between neighboring reflectors 108 may be customized, as desired for a given target application or end-use. In a more general sense, and in accordance with some embodiments, the particular configuration of reflector assembly 106 may be customized, as direct to achieve a given desired illumination result. Numerous configurations and variations will be apparent in light of this disclosure.

In accordance with some embodiments, reflector assembly 106 may be configured such that at least one reflector 108 differs in orientation from at least one other reflector 108 in at least one direction (e.g., such as generally can be seen with respect to FIG. 2). Such a reflector assembly 106 may be considered, in a general sense, a one-dimensional reflector assembly 106. In accordance with some embodiments, reflector assembly 106 may be configured such that at least one reflector 108 differs in orientation from at least one other reflector 108 in at least two directions (e.g., such as generally can be seen with respect to FIG. 3). Such a reflector assembly 106 may be considered, in a general sense, a two-dimensional reflector assembly 106.

In some embodiments, reflector assembly 106 may be configured such that all (or some sub-set) of its reflectors 108 generally converge (e.g., such as can generally be seen with respect to FIGS. 4A-4B). In some embodiments, reflector assembly 106 may be configured such that all (or some sub-set) of its reflectors 108 generally diverge (e.g., such as can generally be seen with respect to FIGS. 5A-5B). The amount of optional convergence or divergence for a given reflector assembly 106 may be customized, as desired for a given target application or end-use. In some cases, reflector assembly 106 may be configured such that all (or some sub-set) of its constituent reflectors 108 are offset from one another in a manner that eliminates or otherwise reduces shadowing for luminaire 100. To that end, in some cases, the optical axes of reflectors 108 may be configured to converge to a point (e.g., a virtual point behind body 114).

Reflector assembly 106 may be formed, in part or in whole, from any one, or combination, of reflective material(s), such as, for example, aluminum (Al), silver (Ag), gold (Au), or a composite (e.g., a ceramic) or polymer (e.g., a plastic) doped or covered with one or more reflective materials (e.g., aluminized plastic). In some cases, reflector assembly 106 may be formed from one or more dielectric materials, which may be provided in a single layer or a multi-layer stack (e.g., bi-layer, tri-layer, and so forth). In some cases, reflector assembly 106 may be formed, in part or in whole, from a stamped or polished metal. Other suitable construction materials for reflector assembly 106 will depend on a given application and will be apparent in light of this disclosure.

Reflector assembly 106 may be generally planar or non-planar, in part or in whole, as desired for a given target application or end-use. In some embodiments, reflector assembly 106 may be formed such that its constituent reflector(s) 108 constitute a monolithic element (e.g., a single, unitary element). In some other embodiments, reflector assembly 106 may be formed such that its constituent reflector(s) 108 constitute separate, individual elements, assemblage of which may involve affixing, adjoining, or disposing adjacent one another those elements. To these ends, reflector assembly 106 may be formed, in part or in whole, via any one, or combination, of suitable manufacturing processes, such as, for example, an injection molding process, a sheet metal bending process, and an extrusion process. Numerous suitable configurations and formation techniques will be apparent in light of this disclosure.

The particular geometry and dimensions of reflector assembly 106 may be customized, as desired for a given target application or end-use. In some cases, reflector assembly 106 may be of generally triangular, quadrilateral, pentagonal, hexagonal, or other polygonal footprint (e.g., as viewed from a top-down vantage). In some other cases, reflector assembly 106 may be of generally circular, elliptical, oval, or other curved footprint (e.g., as viewed from a top-down vantage). In some instances, reflector assembly 106 may have at least one of a width (e.g., x-width in the x-direction), a length (e.g., y-length in the y-direction), and a height (e.g., z-height in the z-direction) in the range of about 0.1-12 inches (e.g., about 0.1-6 inches, about 6-12 inches, or any other sub-range in the range of about 0.1-12 inches). In some instances, reflector assembly 106 may have at least one of a width, a length, and a height in the range of about 12-24 inches (e.g., about 12-18 inches, about 18-24 inches, or any other sub-range in the range of about 12-24 inches). In some instances, reflector assembly 106 may have at least one of a width, a length, and a height of about 24 inches or greater (e.g., about 30 inches or greater, about 36 inches or greater, about 42 inches or greater, or about 48 inches or greater). Other suitable geometries and dimensions for reflector assembly 106 will depend on a given application and will be apparent in light of this disclosure.

In accordance with some embodiments, luminaire 100 optionally may include one or more optical elements configured to be optically coupled with all (or some sub-set) of the reflector(s) 108 of reflector assembly 106. In some cases, a given reflector 108 may be configured to physically host, in part or in whole, a given optional optical element (e.g., an optic may be at least partially disposed within a reflective member 108*a* or reflective cavity 108*b*, as the case may be). In some cases, a given optical element may be disposed external to or otherwise remote from a given reflector 108, but still optically coupled therewith.

A given optical element may be configured to transmit, in part or in whole, emissions received from a given emitter 102 associated with a reflector 108 optically coupled therewith, in accordance with some embodiments. To that end, a given optional optical element may be formed from any one, or combination, of suitable optical materials. For instance, in some embodiments, a given optic may be formed from a polymer, such as poly(methyl methacrylate) (PMMA) or polycarbonate, among others. In some embodiments, a given optic may be formed from a ceramic, such as sapphire ($Al_2O_3$) or yttrium aluminum garnet (YAG), among others. In some embodiments, a given optic may be formed from a glass. In some embodiments, a given optic may be formed from a material of high refractive index, such as silicone or an epoxy. In some embodiments, a given optic may be formed from a combination of any of the aforementioned materials.

Furthermore, the dimensions and geometry of a given optional optical element may be customized, as desired for a given target application or end-use. In some embodiments, a given optional optical element may be generally planar or non-planar, in part or in whole, as desired for a given target application or end-use. In some instances, a given optional optical element may be a single layer or a multi-layer optical structure (e.g., bi-layer, tri-layer, and so forth).

A given optional optical element may be of any of a wide range of configurations. In some embodiments, a given optic may be or otherwise include a lens, such as but not limited to a Fresnel lens, a converging lens, a compound lens, or a micro-lens array. In some embodiments, a given optic may be or otherwise include an optical dome or optical window. In some instances, a given optic may be configured to focus or collimate (or both) emissions transmitted therethrough. In some instances, a given optic may be configured to provide for conversion of the output of emitter(s) 102. To that end, the optic may be or otherwise include a phosphor material that converts emissions received thereby to emissions of different wavelength(s). In some instances, a given optic may be configured to provide for mixing of the output of emitter(s) 102. To that end, the optic may be or otherwise include a diffuser material. In some instances, a given optic may be configured to provide for beam-shaping. To that end, the optic may be or otherwise include a light-shaping diffuser (LSD) material. In some instances, a given optic may be configured to provide for polarization of the output of emitter(s) 102. In some cases, a given optic may include one or more prismatic structures configured to cause emissions exiting that optic to converge or diverge, as desired. Such prismatic structures may be embedded or surficial (or both) and may be configured to provide for a minimal, maximal, or other given degree of beam spot overlap for light beams produced by emitter(s) 102, in accordance with some embodiments.

In some cases, a given optional optical element may be formed as a singular piece of optical material, providing a monolithic optical structure. In some other cases, a given optic may be formed from multiple pieces of optical material, providing a multi-piece optical structure. As will be appreciated in light of this disclosure, it may be desirable to ensure that any such optional optical elements are compatible with PCB(s) 104 and reflector assembly 106, either or both of which, as previously noted, may be flexible or articulated in some embodiments.

In some cases, a given optic may be a fixed optical element. In some other cases, a given optic may be an electro-optic tunable optical element configured to be electronically adjusted, thereby providing for electronic adjustment of any one, or combination, of beam direction, beam angle, beam size, beam distribution, intensity, and color, among other emissions characteristics. In some cases, a given optic may be configured to reduce chromatic aberration at high angles. Other suitable configurations for optional optic(s) will depend on a given application and will be apparent in light of this disclosure.

In some embodiments, luminaire 100 optionally may include one or more heatsink portions configured to facilitate heat dissipation for emitter(s) 102. To that end, a given optional heatsink portion may be formed, in part or in whole, from any one, or combination, of suitable thermally conductive material(s), such as, for example, aluminum (Al), copper (Cu), brass, steel, or a composite or polymer (e.g., ceramics, plastics, and so forth) optionally doped with thermally conductive material(s). The particular geometry and dimensions of a given optional heatsink portion may be customized, as desired for a given target application or end-use. As will be appreciated in light of this disclosure, it may be desirable to ensure that optional heatsink portion(s) are compatible with PCB(s) 104 and reflector assembly 106, either or both of which, as previously noted, may be flexible or articulated in some embodiments. Other suitable configurations for optional heatsink portion(s) will depend on a given application and will be apparent in light of this disclosure.

In accordance with some embodiments, reflector assembly 106 may be configured to be assembled with or otherwise disposed over PCB(s) 104 such that emitter(s) 102 reside, at least in part, within (e.g., internal to or otherwise on) reflector(s) 108. In some cases, reflector assembly 106 may be configured to be placed in direct physical contact with PCB(s) 104, whereas in some other cases, one or more intervening elements (e.g., spacers) may be disposed between reflector assembly 106 and PCB(s) 104, physically displacing reflector assembly 106 and PCB(s) 104 from one another. In some cases, reflector assembly 106 may be configured to physically align with PCB(s) 104 in one or more particular orientations, so as to ensure repeatability and ease in achieving a given desired alignment of reflector(s) 108 with respect to emitter(s) 102 populated over PCB(s) 104. To that end, reflector assembly 106 optionally may include one or more alignment features configured to physically register with corresponding feature(s) of PCB(s) 104 (or luminaire 100 more generally), in accordance with some embodiments.

In accordance with some embodiments, reflector assembly 106 may be displaced laterally, rotationally, or both with respect to PCB(s) 104. For instance, in an example case, reflector assembly 106 may be positioned with respect to PCB(s) 104 such that rotational displacement thereof causes outermost reflector(s) 108 to move with respect to PCB(s) 104 to a greater degree than innermost reflector(s) 108. This may cause the resultant outermost beams to diverge more than the innermost ones (e.g., in a manner similar, in a general sense, to a luminaire configured to rotate a lens array with respect to its emitters).

In some cases, a given reflector 108 may be configured to host or otherwise be associated with only a single emitter 102; thus, a single reflective member **108*a* or reflective cavity 108*b*, as the case may be, may serve to reflect emissions for a single corresponding emitter 102, in accordance with some embodiments. In some other cases, a given reflector 108 may be configured to host or otherwise be associated with a plurality of emitters 102; thus, a single reflective member 108*a* or reflective cavity 108*b*, as the case may be, may serve to reflect emissions for two or more corresponding emitters 102**, in accordance with some embodiments.

The particular configuration of housing 120 may be customized, as desired for a given target application or end-use. As will be appreciated in light of this disclosure, housing 120 may be constructed, in part or in whole, with any of the example materials discussed above, for instance, with respect to optional heatsink portion(s), in accordance with some embodiments. In some embodiments, housing 120 may be formed from a sheet metal or a cast metal. The particular shape and dimensions of housing 120 may be customized as well. Numerous suitable configurations for housing 120 will be apparent in light of this disclosure.

Example Installations

Returning to FIG. 1, as can be seen, luminaire 100 may be configured, in accordance with some embodiments, to be mounted over or on a mounting surface 10, such as, for example, a ceiling, a drop ceiling tile configured for installation in any standard or custom drop ceiling grid, a wall, a floor, or a step. Such mounting may be provided in a temporary or permanent manner, as desired. In some cases, luminaire 100 may be in direct physical contact with mounting surface 10, whereas in some other cases, an intermediate structure, such as a support plate, a support rod, or other suitable support structure, may be disposed between luminaire 100 and mounting surface 10. In some cases, luminaire 100 may be configured as a recessed lighting fixture for mounting in mounting surface 10 (e.g., such as is generally depicted in FIG. 1). In some other cases, luminaire 100 may be configured as a pendant-type, a sconce-type, or other suspended or extended fixture for mounting on mounting surface 10. In some other embodiments, luminaire 100 may be configured as a free-standing or otherwise portable lighting device, such as a desk lamp or a torchière lamp, for example. Numerous suitable configurations will be apparent in light of this disclosure.

In some cases, mounting surface 10 may have one or more apertures 16 formed therein that pass through the thickness of mounting surface 10 (e.g., from a first side 12 to an opposing second side 14 thereof). In accordance with some embodiments, luminaire 100 may be positioned relative to a given aperture 16 such that light emitted by emitter(s) 102 emerges from luminaire 100 with minimal or otherwise negligible overlap with the perimeter of that aperture 16, thus helping to ensure that substantially all of the light emitted by emitter(s) 102 exits luminaire 100. In some instances, a given aperture 16 may host or otherwise be associated with one or more optical structures configured to adjust the light output of luminaire 100, such as, for example, a focusing lens, a collimating lens, a diffuser sheet configured to blend beam spots, or a combination thereof, among others.

The geometry and size of a given aperture 16 may be customized, as desired for a given target application or end-use. In some instances, the geometry and size of a given aperture 16 may be generally commensurate with the geometry and dimensions of luminaire 100 and its particular arrangement of emitter(s) 102. In some cases, a given aperture 16 may be substantially circular, elliptical, or some other closed curve shape. In some other cases, a given aperture 16 may be substantially square, rectangular, triangular, pentagonal, hexagonal, or some other polygonal shape. In some instances, a given aperture 16 may be smaller in size than the distribution area of emitter(s) 102. Thus, in some instances, such an aperture 16 may be smaller in size than the light field of luminaire 100; that is, it may be smaller than the physical distribution area of emitter(s) 102 within housing 120. In some cases, a given aperture 16 may be configured such that one or more of the light beams produced by emitter(s) 102 pass through a focal point generally located within that aperture 16. Other suitable configurations for mounting surface 10 and its aperture(s) 16 will depend on a given application and will be apparent in light of this disclosure.

In some cases, a trim 18, such as a bezel, collar, or baffle, optionally may be utilized with luminaire 100. Optional trim 18 may be configured to reside within or about (or both) a given aperture 16, for instance, adjacent a side 12 or 14 of mounting surface 10. Trim 18 may have one or more apertures 20 formed therein that generally correspond in quantity, geometry, and dimensions with aperture(s) 16 formed in mounting surface 10. The shape and dimensions of a given aperture 20 may be customized, as desired for a given target application or end-use. In some cases, the shape and dimensions may be substantially the same as (e.g., within a given tolerance) a given aperture 16. In some cases, a given aperture 20 may be smaller in size than the distribution area of emitter(s) 102. Thus, in some instances, that aperture 20 may be smaller in size than the light field of luminaire 100; that is, it may be smaller than the physical distribution area of emitter(s) 102 within housing 120. In some cases, a given aperture 20 may be provided with a geometry and size like that of a given aperture 16. In some cases, a given aperture 20 may be configured such that one or more of the light beams produced by emitter(s) 102 pass through a focal point generally located within that aperture 20. Other suitable configurations for optional trim 18 and its aperture(s) 20 will depend on a given application and will be apparent in light of this disclosure.

In some cases, one or more optics optionally may be disposed within a given aperture 20 of trim 18. As will be appreciated in light of this disclosure, such optional optic(s) may be of any of the example materials and configurations discussed above, for instance, with respect to optional optic(s) associated with reflector(s) 108 of reflector assembly 106, in accordance with some embodiments.

Example Output Distributions

Figure 7:
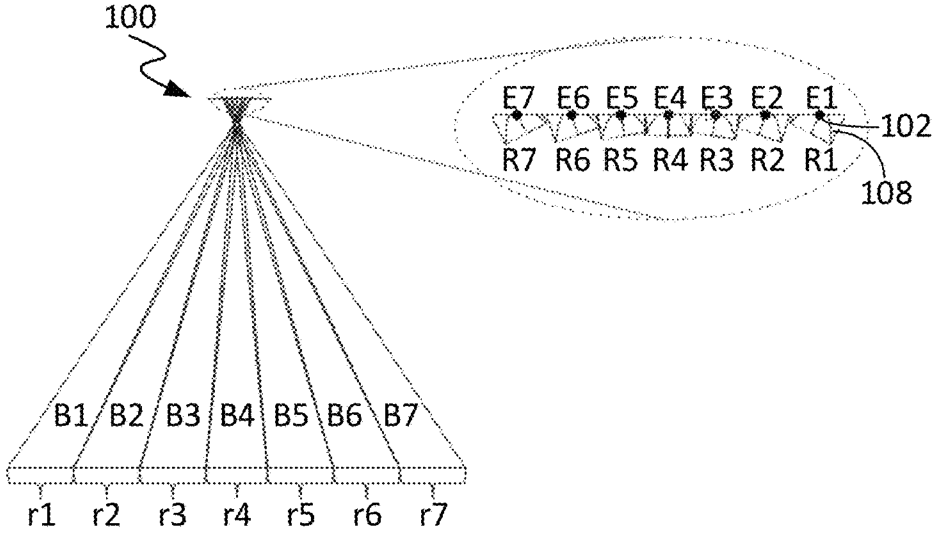
FIG. 7 illustrates an example luminaire configured in accordance with an embodiment of the present disclosure.

FIG. 7 illustrates an example luminaire 100 configured in accordance with an embodiment of the present disclosure. As can be seen, the emissions of a given emitter 102 (E) may be reflected by an associated reflector 108 (R) (e.g., reflective member 108*a* or reflective cavity 108*b*, as the case may be) of reflector assembly 106, and the resultant beam (B) may illuminate a given region (r). For instance, the emissions of emitter 102 E1 may be reflected by associated reflector 108 R1, and the resultant beam B1 may illuminate a region r1. Similar relationships may exist for emitters 102 E2-E7 and their respective associated reflectors 108 R2-R7 in FIG. 7.

By customizing individual reflector 108 characteristics (e.g., type, dimensions, cross-sectional geometry, surface texture, and so forth) and, when optionally included, optical element(s) associated therewith, the individual beam properties (or beam profile) of a given emitter 102 may be customized, as desired for a given target application or end-use. In some cases, generally closed curve beam shapes (e.g., circular, elliptical, and so forth) may be produced by luminaire 100. In some cases, generally polygonal beam shapes (e.g., square, rectangular, hexagonal, and so forth) may be produced by luminaire 100. Numerous other beam properties may be produced via luminaire 100, as desired for a given target application or end-use. For example, the beams B1-B7 associated with each emitter 102 E1-E7 may have different beam properties. Beam properties may include, but are not limited to, a beam location, a beam orientation, a beam angle, an intensity distribution, and a color.

In accordance with some embodiments, the angular distribution of a given light beam output by luminaire 100 may be customized, as desired for a given target application or end-use. As will be appreciated in light of this disclosure, beams with higher angles (e.g., such as those which would be associated with emitters 102 E1 and E7 in FIG. 7, for instance) may tend to produce larger illumination spots than beams with lower angles (e.g., such as that which would be associated with emitter 102 E4 in FIG. 7, for instance). Thus, the configuration of reflector assembly 106 (and any optional optics, if included) may be customized such that higher-angle beams produce beam spots of about the same size and geometry as lower-angle beams, in accordance with some embodiments.

Figure 8A:
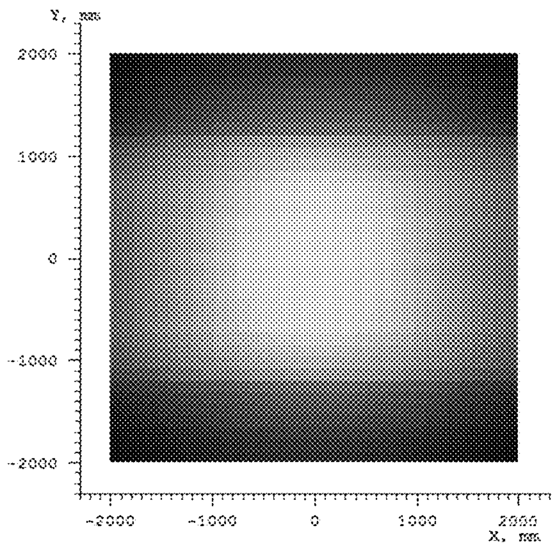
FIGS. 8A-8C each illustrate a simulation result for an illuminance pattern on a plane at a set distance from a luminaire including a reflector assembly configured as in FIG. 2, in accordance with an embodiment of the present disclosure.
Figure 8B:
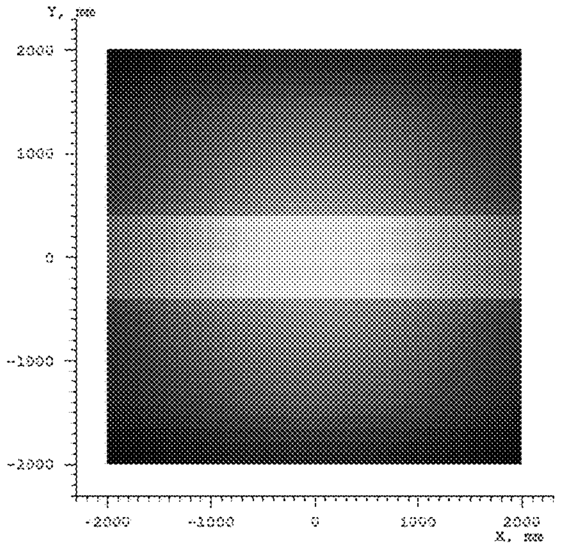
Figure 8C:
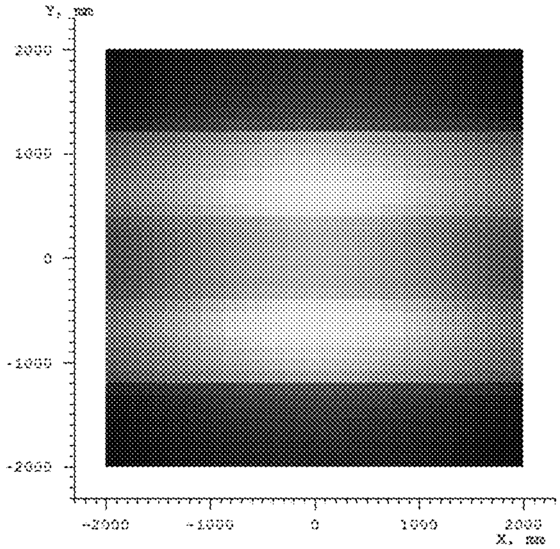

FIGS. 8A-8C each illustrate a simulation result for an illuminance pattern on a plane at a set distance from a luminaire 100 including a reflector assembly 106 configured as in FIG. 2, in accordance with an embodiment of the present disclosure. For FIG. 8A, emitters 102 located at all reflective members 108*a* (e.g., reflective members 108*a* of Rows 1-7) are turned on, providing a generally uniform illumination area. For FIG. 8B, emitters 102 located at central reflective members 108*a* (e.g., reflective members 108*a* of Rows 3-5) are turned on, providing a generally narrow illumination pattern. For FIG. 8C, emitters 102 located at peripheral reflective members 108*a* (e.g., reflective members 108*a* of Rows 1-2 and 6-7) are turned on, providing a generally dispersed illumination pattern.

Figure 9A:
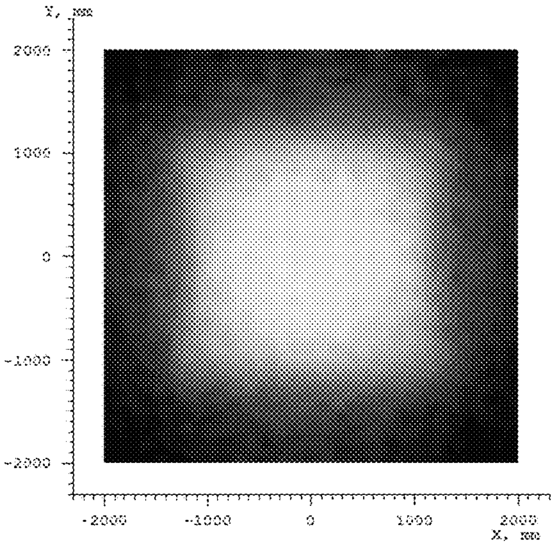
FIGS. 9A-9C each illustrate a simulation result for an illuminance pattern on a plane at a set distance from a luminaire including a reflector assembly configured as in FIG. 3, in accordance with an embodiment of the present disclosure.
Figure 9B:
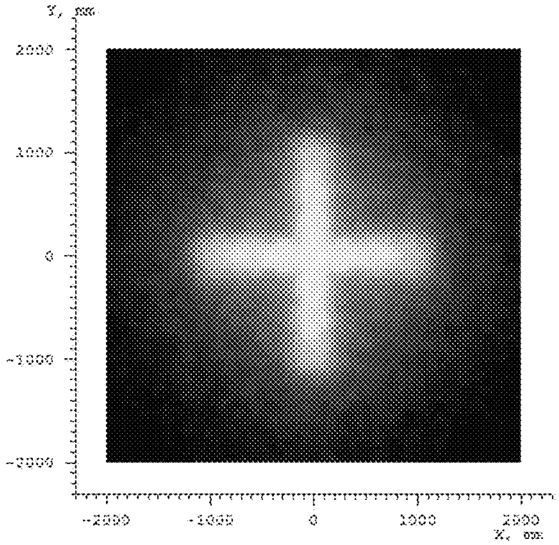
Figure 9C:
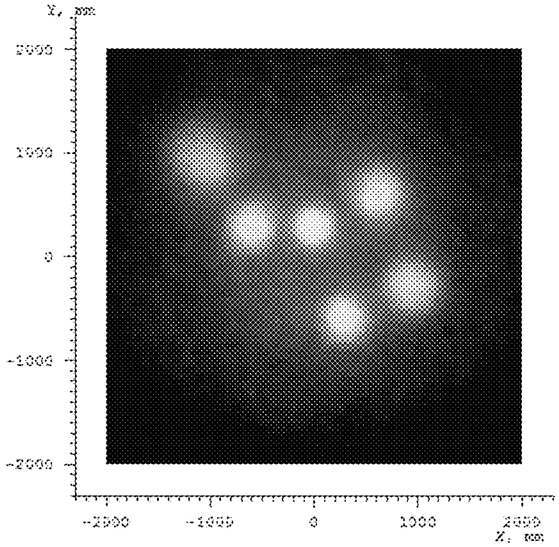

FIGS. 9A-9C each illustrate a simulation result for an illuminance pattern on a plane at a set distance from a luminaire 100 including a reflector assembly 106 configured as in FIG. 3, in accordance with an embodiment of the present disclosure. For FIG. 9A, emitters 102 located at all reflective members 108*a* (e.g., reflective members 108*a* of Rows 1-7 and Columns 1-7) are turned on, providing a generally uniform illumination area. For FIG. 9B, emitters 102 located at central reflective members 108*a* (e.g., reflective members 108*a* of Row 4 and Column 4) are turned on, providing a generally cruciform illumination pattern. For FIG. 9C, several random emitters 102 located at various reflective members 108*a* are turned on, providing a generally distributed, spotty illumination pattern.

Numerous embodiments will be apparent in light of this disclosure. One example embodiment provides a solid-state luminaire including: a housing; a printed circuit board (PCB) disposed within the housing; a plurality of solid-state emitters populated over the PCB; and a reflector assembly disposed within the housing and including a plurality of reflective members disposed over the PCB such that at least one of the solid-state emitters at least partially resides within at least one of the reflective members, wherein the reflector assembly is configured to direct emissions of the at least one of the solid-state emitters out of the housing. In some cases, the plurality of reflective members are formed as a monolithic element. In some cases, the plurality of reflective members are formed as an assemblage of separate elements. In some instances, at least one of the reflective members includes at least one of a parabolic reflector, a spun reflector, an elliptical reflector, a cone reflector, and a freeform reflector. In some instances, the reflector assembly is configured such that emissions of the at least one of the solid-state emitters reflect from a reflective surface of the at least one of the reflective members, the reflective surface at least partially provided by a reflective layer disposed over at least a portion of a topography of the at least one reflective member. In some cases, the reflector assembly is planar. In some instances, the reflector assembly is configured such that at least one of the reflective members differs in orientation from at least one other of the reflective members in at least one direction. In some instances, the reflector assembly is configured such that at least one of the reflective members differs in orientation from at least one other of the reflective members in at least two directions. In some cases, the reflector assembly is configured such that optical axes of the plurality of reflective members converge. In some instances, the reflector assembly is configured such that optical axes of the plurality of reflective members diverge.

Another example embodiment provides a solid-state luminaire including: a housing; a printed circuit board (PCB) disposed within the housing; a plurality of solid-state emitters populated over the PCB; and a reflector assembly disposed within the housing and including a body having a plurality of reflective cavities disposed therein, the reflector assembly disposed over the PCB such that at least one of the solid-state emitters at least partially resides within at least one of the reflective cavities, wherein the reflector assembly is configured to direct emissions of the at least one of the solid-state emitters out of the housing. In some cases, the body is formed as a monolithic element. In some cases, the body is formed as an assemblage of separate elements. In some instances, at least one of the reflective cavities includes at least one of a parabolic reflector, a spun reflector, an elliptical reflector, a cone reflector, and a freeform reflector. In some instances, the reflector assembly is configured such that emissions of the at least one of the solid-state emitters reflect from a reflective surface of the at least one of the reflective cavity, the reflective surface at least partially provided by a reflective layer disposed over at least a portion of a topography of the at least one reflective cavity. In some cases, the reflector assembly is planar. In some instances, the reflector assembly is configured such that at least one of the reflective cavities differs in orientation from at least one other of the reflective cavities in at least one direction. In some instances, the reflector assembly is configured such that at least one of the reflective cavities differs in orientation from at least one other of the reflective cavities in at least two directions. In some cases, the reflector assembly is configured such that optical axes of the plurality of reflective cavities converge. In some instances, the reflector assembly is configured such that optical axes of the plurality of reflective cavities diverge.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A solid-state luminaire comprising:
- a housing;
- a printed circuit board (PCB) disposed within the housing, wherein the PCB is a single, monolithic, planar section;
- a plurality of solid-state emitters populated over the PCB; and
- a reflector assembly disposed within the housing and comprising a plurality of reflectors disposed over the PCB such that at least one of the solid-state emitters at least partially resides within at least one of the reflectors, wherein:
  - the reflector assembly is configured to direct emissions of the at least one of the solid-state emitters out of the housing;
  - the reflector assembly is configured such that at least one of its constituent reflectors differs in orientation from at least one other of the constituent reflectors in a single direction or multiple directions;
  - the reflector assembly is a single, monolithic, planar section; and
  - each of the plurality of reflectors is formed from the reflector assembly and traverses the full thickness of the reflector assembly.

2. The solid-state luminaire of claim 1, wherein a first reflector in the plurality of reflectors comprises one of a parabolic reflector, a spun reflector, an elliptical reflector, a cone reflector, and a freeform reflector.

3. The solid-state luminaire of claim 1, wherein the reflector assembly is configured such that emissions of the at least one of the solid-state emitters reflect from a reflective surface of the at least one of the reflectors, the reflective surface at least partially provided by a reflective layer disposed over at least a portion of a topography of the at least one reflector.

4. The solid-state luminaire of claim 1, wherein the PCB and the reflector assembly are parallel to each other.

5. The solid-state luminaire of claim 1, wherein the reflector assembly is configured such that optical axes of the plurality of reflectors converge.

6. The solid-state luminaire of claim 1, wherein the reflector assembly is configured such that optical axes of the plurality of reflectors diverge.

7. The solid-state luminaire of claim 1, wherein:
- a first reflector in the plurality of reflectors directs emissions from a first solid-state emitter in the plurality of solid-state emitters to emit a first beam;
- a second reflector in the plurality of reflectors directs emissions from a second solid-state emitter in the plurality of solid-state emitters to satisfy a second beam; and
- one or more beam properties of the first beam are different than the one or more beam properties of the second beam.

8. The solid-state luminaire of claim 7, wherein the one or more beam properties comprise at least one of a beam location, a beam orientation, a beam angle, an intensity distribution, and a color.

9. The solid-state luminaire of claim 1, wherein the plurality of reflectors comprises at least one reflective member.

10. The solid-state luminaire of claim 1, wherein the plurality of reflectors comprises at least one reflective cavity.

* * * * *